United States Patent
Ise et al.

[11] Patent Number: 5,293,542
[45] Date of Patent: Mar. 8, 1994

[54] IRIS FOR VIDEO CAMERA

[75] Inventors: Koichi Ise; Yoshinori Tomita, both of Chiba, Japan

[73] Assignee: Sony Corporation, Tokyo, Japan

[21] Appl. No.: 718,970

[22] Filed: Jun. 21, 1991

[30] Foreign Application Priority Data

Jun. 25, 1990 [JP] Japan .................. P166380

[51] Int. Cl.⁵ .................. H04N 5/238; H04N 5/30
[52] U.S. Cl. .................. 358/228; 348/335; 354/228; 354/230; 354/246; 354/270; 354/274; 354/275; 354/296; 359/739
[58] Field of Search .................. 358/228, 209; 354/228, 354/230, 246, 270, 274, 295, 296; 359/739

[56] References Cited

U.S. PATENT DOCUMENTS

| | | | |
|---|---|---|---|
| 2,351,932 | 6/1944 | Deckel et al. | 354/230 |
| 2,465,578 | 3/1949 | Czarnikow et al. | 354/274 |
| 3,377,427 | 4/1968 | Fischer | 358/228 |
| 4,047,212 | 9/1977 | Yamada | 354/270 |
| 4,113,359 | 9/1978 | Koike et al. | 350/269 |
| 4,298,265 | 11/1981 | Tanaka et al. | 354/246 |
| 4,319,821 | 3/1982 | Tezuka et al. | 354/230 |

*Primary Examiner*—Joseph Mancuso
*Assistant Examiner*—Bipin Shalwala
*Attorney, Agent, or Firm*—Lewis H. Eslinger; Jay H. Maioli

[57] ABSTRACT

A video camera in which an iris in an optical system is composed of a plurality of diaphragms, and at least two of the plurality of diaphragms are respectively provided with a light amount limiting filter such that the light amount limiting filters attached on the at least two diaphragms completely surround a transparent portion when the iris is half closed, to thereby provide satisfactory characteristics of the optical system when the iris is half closed.

3 Claims, 7 Drawing Sheets

IRIS FOR VIDEO CAMERA

BACKGROUND OF THE INVENTION

1. Field of the Invention

The present invention generally relates to video cameras and, more particularly, is directed to an optical system including image-pickup lenses and so on.

2. Description of the Prior Art

A video camera is generally used to convert an optical image arriving at an image pick-up plane of an imager means such as a solid state imager element (hereinafter referred to as a CCD (charge-coupled device)) or the like through an imager lens to an electrical video signal. For limiting the amount of light arriving at the image pick-up plane of the imager means within an appropriate constant range, an iris composed of a plurality of diaphragms is provided in front of or behind the imager lens. The amount of light arriving at the image pick-up plane of the imager means such as a CCD or the like can be adjusted to be substantially constant by changing an aperture formed by the iris in accordance with the amount of incident light.

However, the imager lens inherently implies a phenomenon generally called vignetting by which a peripheral portion of a picked-up image becomes darker than a central portion thereof. FIGS. 1 and 2 are diagrams for explaining the vignetting. As shown in FIG. 1, lights incident with angles $\theta_1$ and $\theta_2$ deviated from the central axis OA of an optical image to be taken are partially intercepted by the edges of lenses L, whereby cross-sections a, b, c of effective luminous fluxes become smaller as the inclination angles thereof relative to the central axis OA increase and then arrive at an image pick-up plane F. Therefore, the cross-section c of the effective luminous flux arriving at a peripheral portion of the image pick-up plane F becomes extremely smaller than the cross-section a of the effective luminous flux arriving at a central portion of the same, as shown in FIG. 2, whereby the peripheral portion becomes darker than the central portion. The amount of the vignetting may vary depending on an opening formed by the iris so that the lenses must be designed so as to reduce the occurrence of the vignetting.

In recent years, the sensitivity of the imager means such as CCD or the like employed in video cameras tends to be enhanced so that, if the iris is not closed almost completly, then an appropriate exposure cannot be obtained when the cameraman takes a picture outdoors. However, if the iris is largely closed, the aperture of the iris becomes a pin-hole shape, thereby incurring the inconvenience such that the resolution of a picked-up image is degraded due to the diffraction of light.

For this reason, a neutral density (ND) filter for limiting the amount of a passing light is arranged on an optical path through which an optical image arrives at the image pick-up plane, such that the amount of a passing light is limited by this ND filter to prevent the iris from being excessively closed (see Japanese Patent Application No. 57-100294). The ND filter reduces the light amount without changing the hue or the like.

The ND filter is attached on any one of the diaphragms constituting the iris such that the ND filter is positioned on the optical path in association with opening and closing movements of the iris, so that the ND filter is moved onto the optical path only when the iris is closed is being closed Nevertheless, the ND filter attached on a diaphragm constituting the iris is moved in association with opening and closing movements of the iris, which results in an inconvenience that inconsistent lighting due to the above-mentioned vignetting becomes extremely prominently depending on the position of the ND filter.

More specifically, as, for example, shown in FIG. 3, suppose that an iris is composed of two diaphragms 2, 3 for narrowing an optical path 1 which are respectively moved in the directions indicated by arrows m, n. The diaphragms 2, 3 are arranged, for example, between two of a plurality of lenses L, as shown in FIG. 1. An ND filter 4 is attached on the diaphragm 3 such that the ND filter 4 is positioned on the optical path 1 by moving the diaphragm 3.

FIG. 4 shows that the ND filter 4 is positioned on the optical path 1 by closing the iris. In the condition that the iris is closed substantially by half, as shown in FIG. 4, there remains a transparent portion 5 at a position deviated from the center of the optical path 1 which is not covered with the ND filter 4.

If the transparent portion 5 remains at a position deviated from the center of the optical path 1 as described above, then vignetting stands out prominently.

FIG. 5 shows the occurrence of vignetting in such a case, i.e., cross-sections a', b', c' of effective luminous flux in the present example (in the condition where the iris is positioned as shown in FIG. 4) corresponding to the cross-sections a, b, c of effective luminous flux arriving at the image pick-up plane F shown in FIG. 2. The cross-section a' of the effective luminous flux arriving at the center of the screen includes a light l passing through the transparent portion 5 on the left side thereof and a light passing through the ND filter on the remaining portion (the hatched area). As for each of the cross-sections b', c' deviated from the center, a light passing through the transparent portion 5 does not arrive due to vignetting, whereby the light passing through the ND filter only arrives. Therefore, a central portion of the imager screen becomes very bright because of the light arriving through the transparent portion 5, while a peripheral portion becomes dark due to the limited light amount by the ND filter, whereby an image whose central portion only is bright is taken. Such a condition occurs when the iris is half closed. However, such a half closed iris is frequently used in actual shooting with a video camera, so that images taken in the above-mentioned condition stand out. If the difference in light amount between the central portion and the peripheral portion of an imager screen is small, it is possible to make the difference inconspicuous to some extent by signal processing performed by a picked up signal processing circuit. However, the light amount on the peripheral portion of the imager plane may sometimes be, for example, approximately ¼ that of the central portion. In such a case, it is not possible to completely correct such difference by means of a picked up signal processing circuit.

OBJECTS AND SUMMARY OF THE INVENTION

Accordingly, it is an object of the present invention to provide an improved iris for video camera in which the aforementioned shortcomings and disadvantages encountered with the prior art can be substantially eliminated.

More specifically, it is an object of the present invention to provide an iris for a video camera by which an image can be prevented from becoming dark in the peripheral portion.

As an aspect of the present invention, a video camera in which an iris comprised in an optical system is composed of a plurality of diaphragms, and at least two of the plurality of diaphragms are respectively provided with a light amount limiting filter such that the light amount limiting filters attached on the at least two diaphragms completely surround a transparent portion when the iris is half closed, to thereby provide satisfactory characteristics of the optical system when the iris is half closed.

The above and other objects, features, and advantages of the present invention will become apparent in the following detailed description of illustrative embodiments thereof to be taken in conjunction with the accompanying drawings, in which like reference numerals are used to identify the same or similar parts in the several views.

DETAILED DESCRIPTION OF THE PREFERRED EMBODIMENTS

A first embodiment of the present invention will hereinafter be described with reference to FIGS. 6 to 9.

Figure 6:
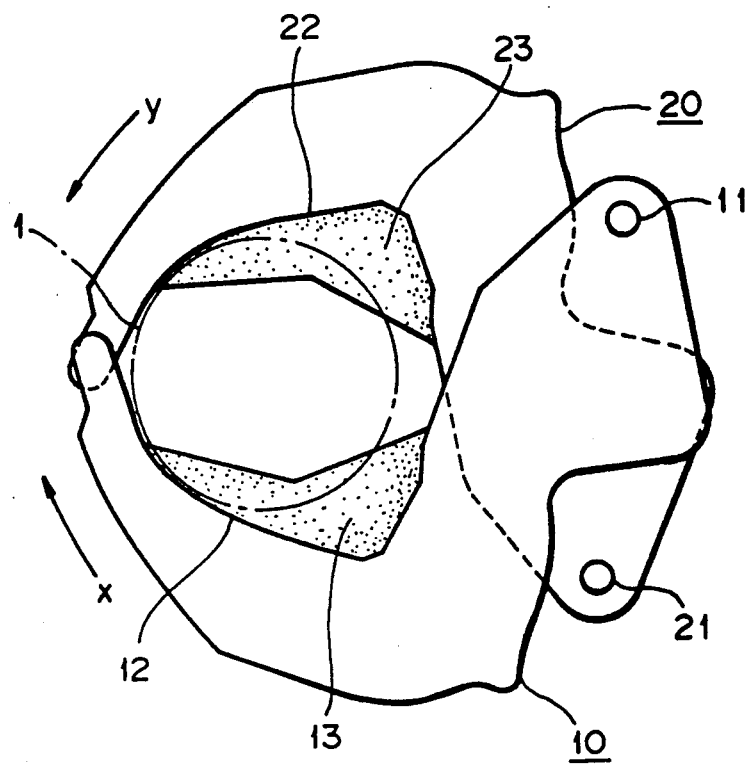
FIGS. 6-9 are plan views respectively illustrating opened and closed conditions of an iris according to an embodiment of the present invention.

FIG. 6 shows an iris used for an optical system of a video camera of the present embodiment. The iris is arranged in front of or behind a lens also in the present embodiment similarly to the prior-art example shown in FIG. 1. The iris of the present embodiment is composed of two diaphragms 10, 20. The respective diaphragms 10, 20 are relatively pivoted on pivoting centers 11, 21 and driven by a predetermined actuator, not shown, to be rotated along arrows x, y in association with each other. By the pivoting movements, cut-away portions 12, 22 of the respective diaphragms 10, 20 intercept an optical path 1 to thereby function as an iris.

In this embodiment, the cut-away portions 12, 22 of the respective diaphragms 10, 20 are provided with ND filters 13, 23, respectively, such that the ND filters 13, 23 are positioned on the optical path 1 in accordance with the positions of the pivoted diaphragms 10, 20. More specifically, when the iris is opened with the diaphragms 10, 20 being opened, as shown in FIG. 6, the ND filters 13, 23 attached on the diaphragms 10, 20 are positioned almost entirely out of the optical path 1. In this opened condition, the ND filters 13 and 23 are opened opposite to each other in the vertical direction. Also, the ND filters 13, 23 respectively have an identical light amount limiting characteristic.

Figure 7:
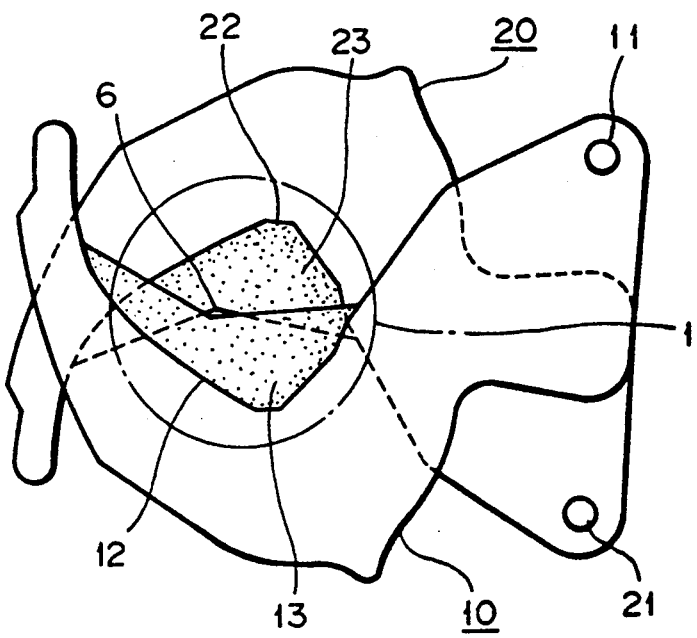

When the diaphragms 10, 20 are half closed as shown in FIG. 7, the cut-away portions 12, 22 of the diaphragms 10, 20 narrow the optical path 1, whereby the ND filters 13, 23 attached on the cut-away portions 12, 22 are positioned on the optical path 1. Thus, an amount of a light passing along the optical path 1 is limited by the two ND filters 13, 23. In this event, a transparent portion 6, which is not covered with the ND filters 13, 23, is formed at a substantially central portion of the optical path 1, whereby the transparent portion 6 is completely surrounded by the two ND filters 13, 23.

When the diaphragms 10, 20 are further closed from this condition, the transparent portion disappears, and the two ND filters 13, 23 overlap, wherein the light on the optical path 1 is transmitted through this overlap portion 7. Also in this event, the overlap portion 7 is positioned at a substantially central portion of the optical path 1.

Figure 9:
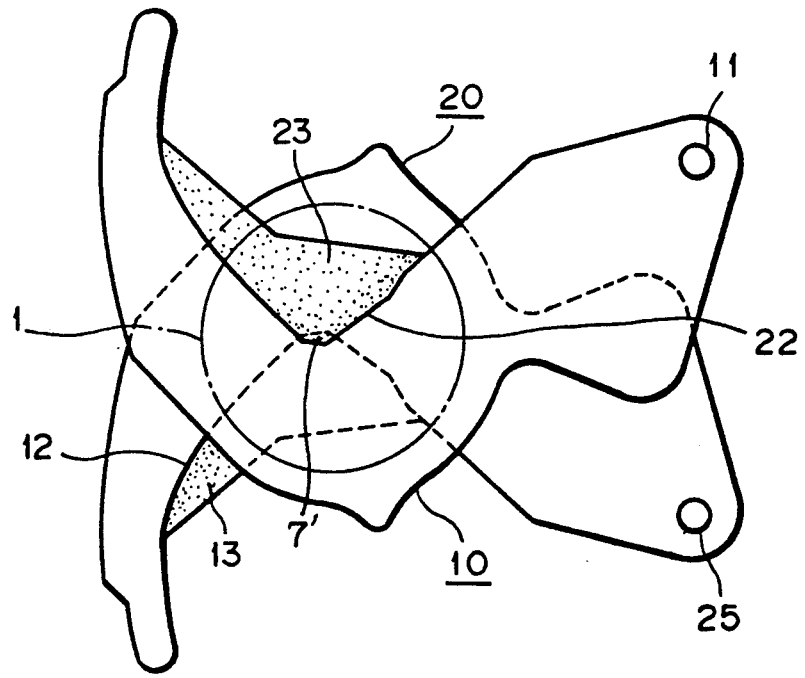

When the diaphragms 10, 20 are further closed from this condition, the area of the overlap portion 7' is reduced, as shown in FIG. 9, thereby reducing an amount of the light passing along the optical path 1.

Figure 5:
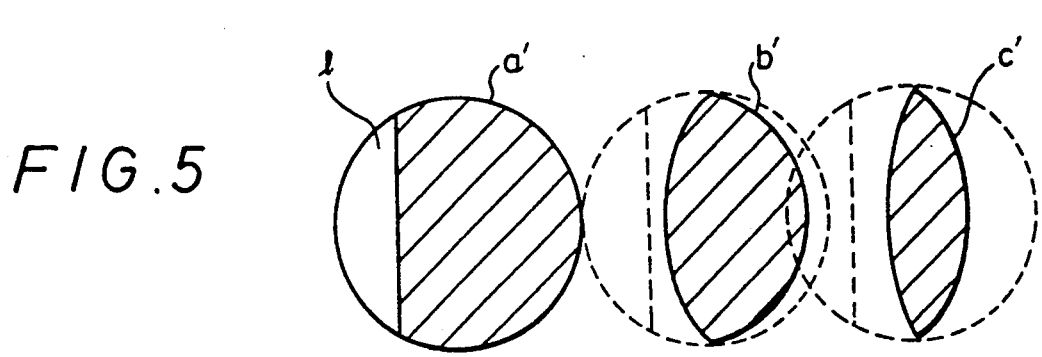

According to the video camera with the iris of the present embodiment as described above, since the ND filters 13, 23 are respectively attached on the two diaphragms 10, 20 constituting the iris, the transparent portion 6 formed by slightly closing the iris on a part of the optical path 1 is completely surrounded by the two ND filters 13, 23. Therefore, the transparent portion 6 is positioned on a substantially central portion of the optical path 1 so that, even if vignetting occurs as described above with reference to FIGS. 1 and 2, a light passing through the transparent portion 6 arrives at a peripheral portion of the imager plane because of the the transparent portion 6 positioned on a substantially central portion of the optical path 1. Thus, the lighting on a central portion of a taken image will never be remarkably different from that on a peripheral portion of the same. In other words, if vignetting occurs, and a part of luminous flux arriving at a peripheral portion of the imager plane has been even if. However, vignetted is a peripheral portion of the effective luminous flux arriving at the peripheral portion of the imager plane, has been vignetted the central portions of respective effective luminous flux are not vignetted and pass through the optical system even if vignetting occurs to the peripheral portion of the effective luminous flux. The central portions of the respective effective luminous flux passing through the optical system without being vignetted pass through the transparent portion 6, and the light passing through the transparent portion 6 also arrives at a peripheral portion of the imager plane, whereby the peripheral portion will not become dark. For example, as compared with a case where an ND filter is attached on only one of the diaphragms and vignetting occurs in the condition shown in FIG. 5, it is possible to ensure approximately three times more light on the peripheral portion of the imager plane. For this reason, according to a video camera having the iris of the present embodiment, satisfactory shooting can be performed where the lighting on the taken image is constant on a central portion as well as on a peripheral portion independently of the closed conditions of the iris. Particularly, a large improvement is expected when an image is picked up with a slightly narrowed iris, compared with the prior art.

Figure 8:
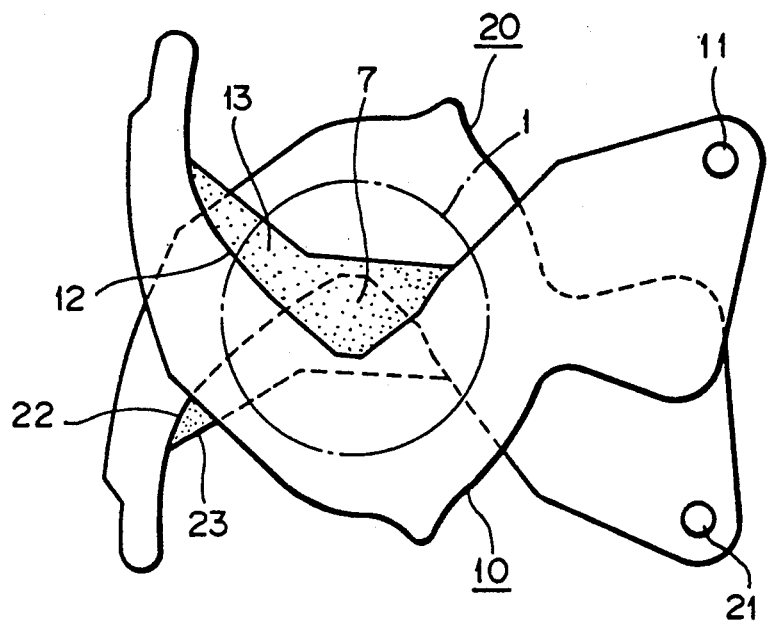

When the iris is tightly narrowed as shown in FIGS. 8 and 9, the light on the optical path 1 passes through only the overlap portion 7 or 7' of the two ND filters 13, 23. As compared with a case where the amount of a passing light is limited only by a single ND filter, the light amount can be limited twice as much, thereby making it possible to efficiently limit the light amount. When the respective ND filters 13, 23 have a density of 0.6 and a transmissivity of 25.1%, the overlap portion 7 or 7' can limit the light amount in a degree similar to an ND filter with a density of 1.2 and a transmissivity of 6.31%. It is only when the iris is tightly narrowed that the light amount is limited by the overlapped portion of the ND filters 13, 23, thereby providing a large difference in the amount of light passing through the optical system between an opened iris and a tightly narrowed iris. It is therefore possible to pick up images in a variety of conditions from a shooting in a dark room (with the opened iris) to a shooting in the bright open air (with the tightly narrowed iris).

Next, another embodiment of the iris for use with a video camera according to the present invention will be described with reference to FIGS. 10 through 12.

Figure 10:
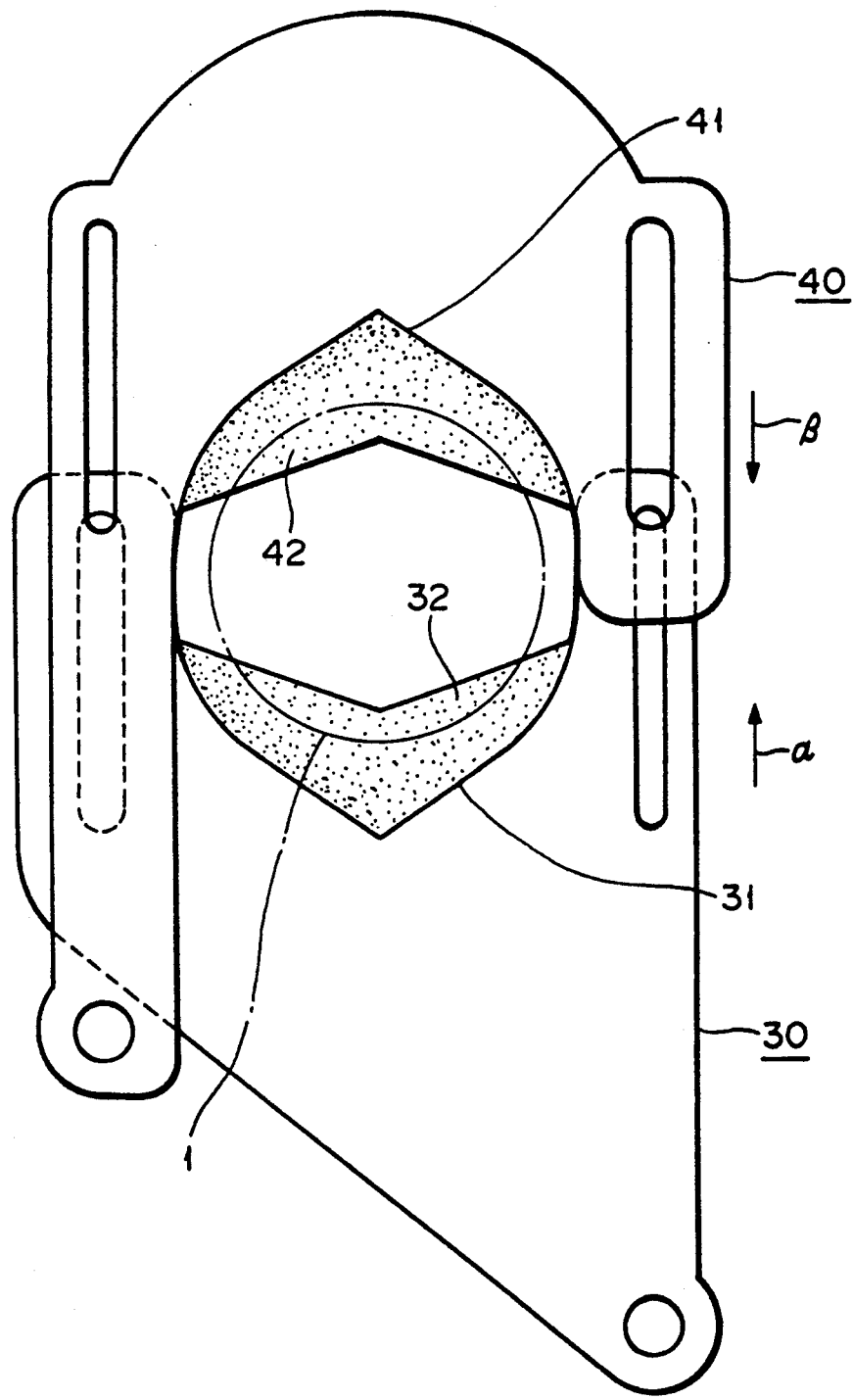
FIGS. 10-12 are plan views respectively illustrating opened and closed conditions of the iris according to another embodiment of the present invention.
Figure 11:
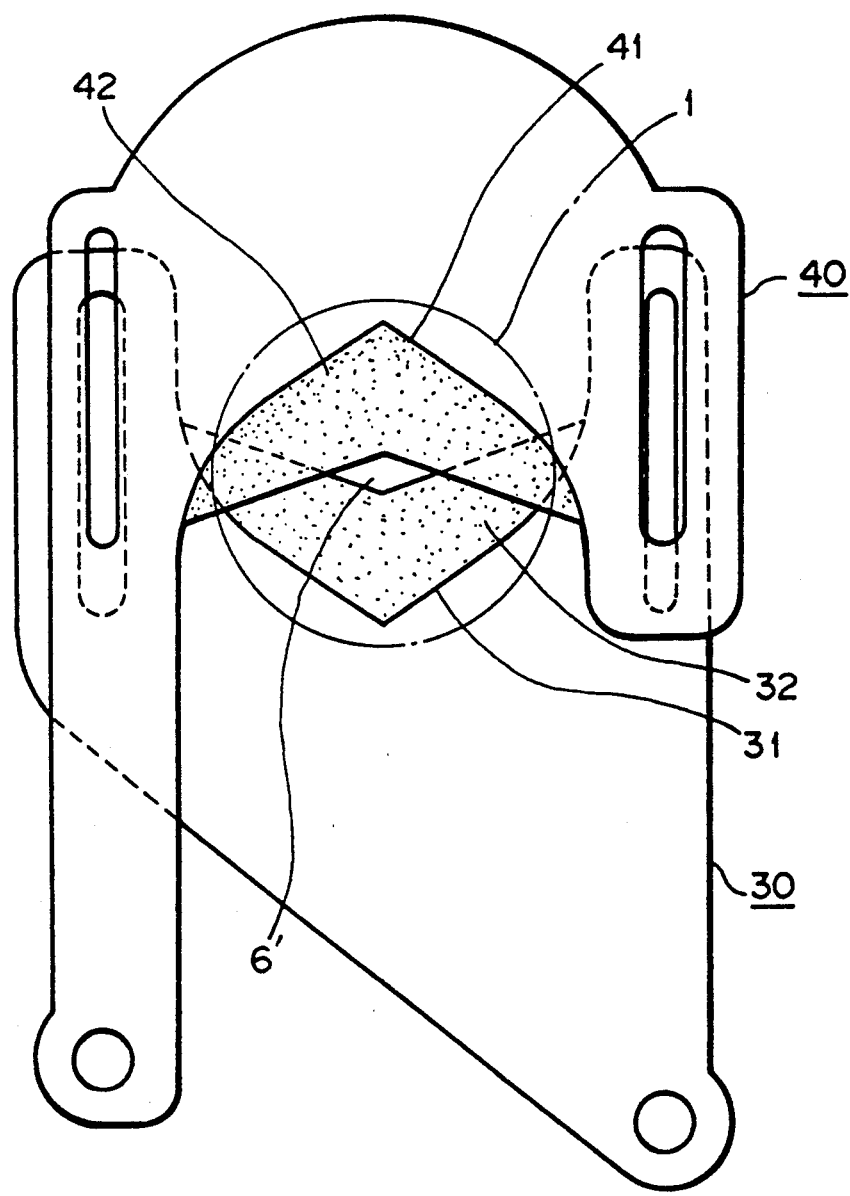
Figure 12:
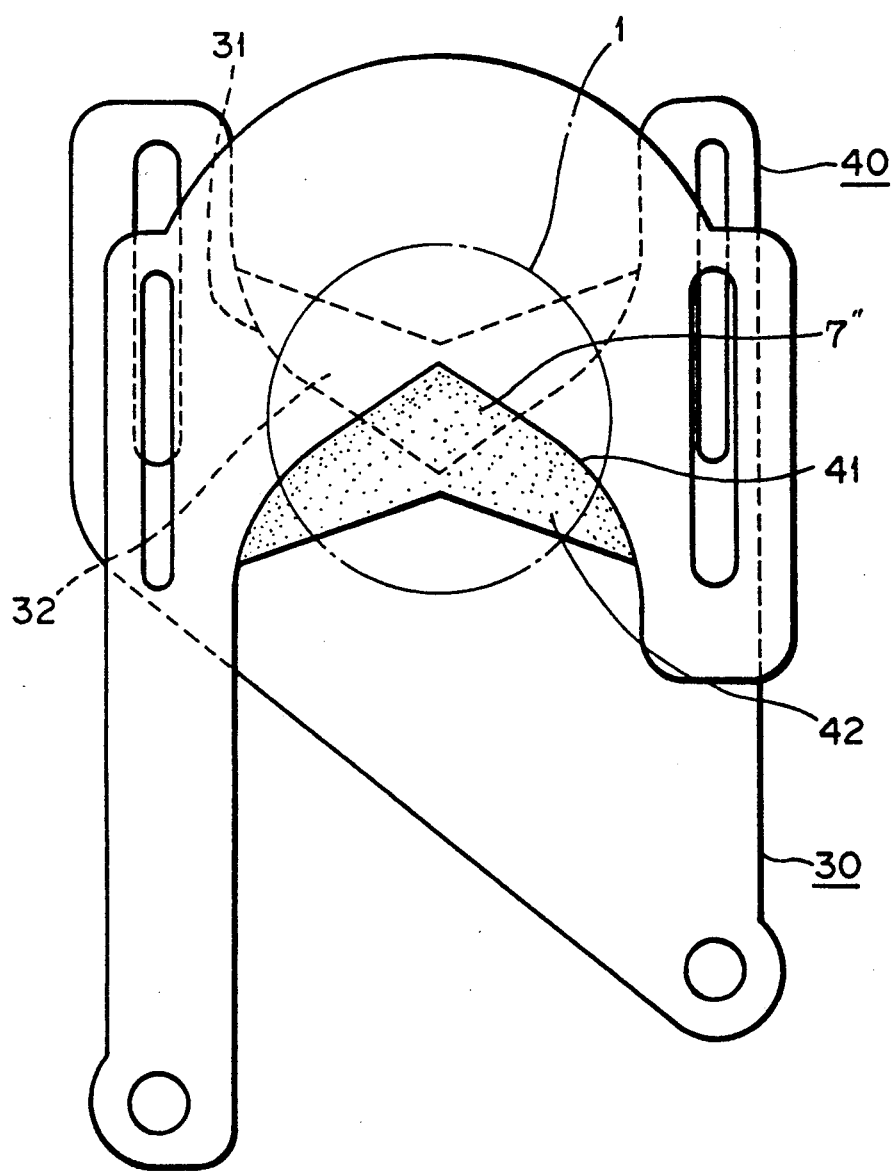

An iris shown in FIGS. 10 to 12 is different from the iris of the above-mentioned embodiment in the opening direction. Two diaphragms 30, 40 constituting the iris are driven by a predetermined actuator (not shown) to be linearly moved from the upper and lower sides along arrows α and β, respectively. That is, when the iris is opened, cut-away portions 31, 41 of the diaphragms 30, 40 are opened up and down with the optical path 1 as a center as shown in FIG. 10. ND filters 32, 42 are attached on the cut-away portions 31, 41 of the diaphragms 30, 40, respectively, such that the ND filters 32, 42 are positioned almost entirely of the optical path 1 when the iris is in an opened condition.

When the iris is linearly closed from the opened condition from the upper and lower sides with the optical path 1 as the center, the cut-away portions 31, 41 of the diaphragms 30, 40 narrow the optical path 1, and the ND filters 32, 42 are positioned on a peripheral portion of the narrowed optical path 1, as shown in FIG. 11. As a consequence, a central portion of the optical path 1 forms a transparent portion 6, completely surrounded by the ND filters 32, 42. At this time, the transparent portion 6' is positioned on a substantially central portion of the optical path 1.

When the iris is further closed from this condition, as shown in FIG. 12, the transparent portion 6' disappears, and the two ND filters 32, 42 overlap with each other, whereby the light on the optical path 1 passes only through an overlap portion 7''. The overlap portion 7'' is positioned on a substantially central portion of the optical path 1 also at this time.

When the iris is further closed from this condition, the area of the overlap portion 7'' is correspondingly reduced. The overlap portion 7'' is always positioned on the substantially central portion of the optical path 1 in this case.

Figure 1:
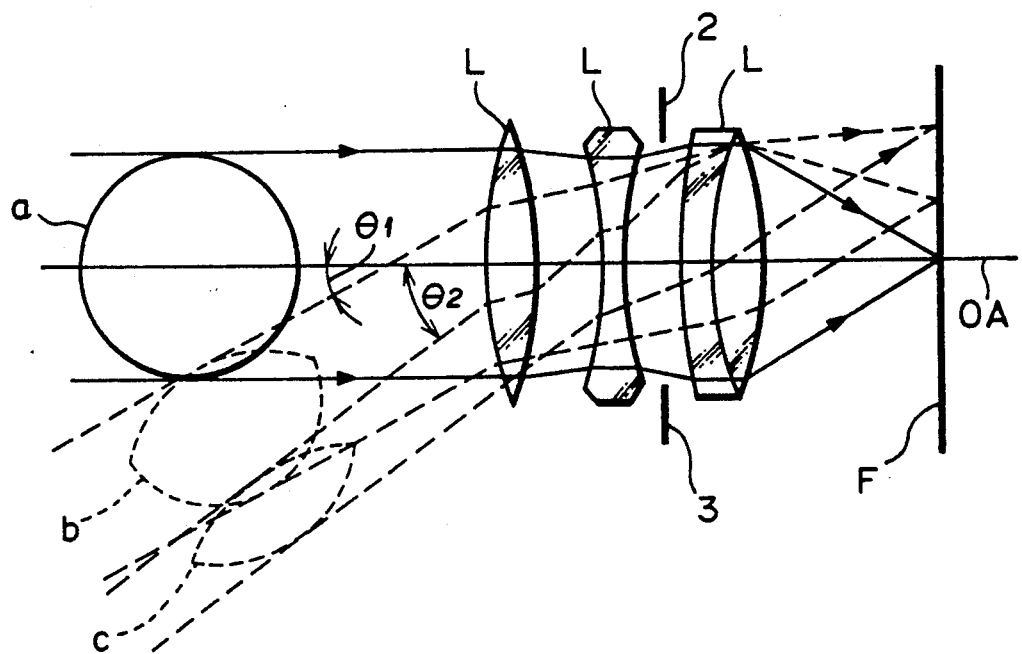
FIGS. 1, 2 and 5 are diagrams respectively used to explain vignetting.
Figure 2:
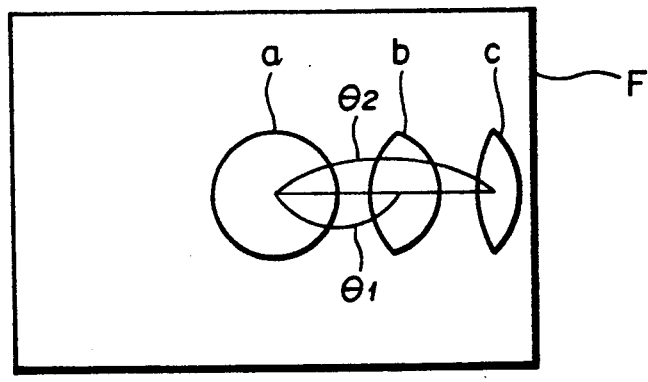
Figure 3:
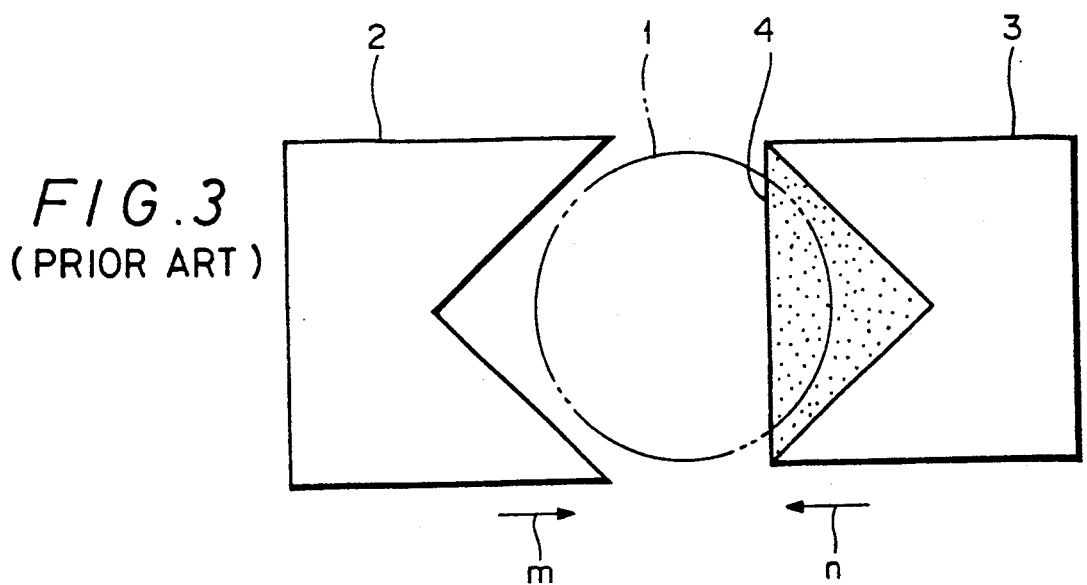
FIGS. 3 and 4 are schematic diagrams respectively showing an example of an iris for a video camera according to the prior art.
Figure 4:
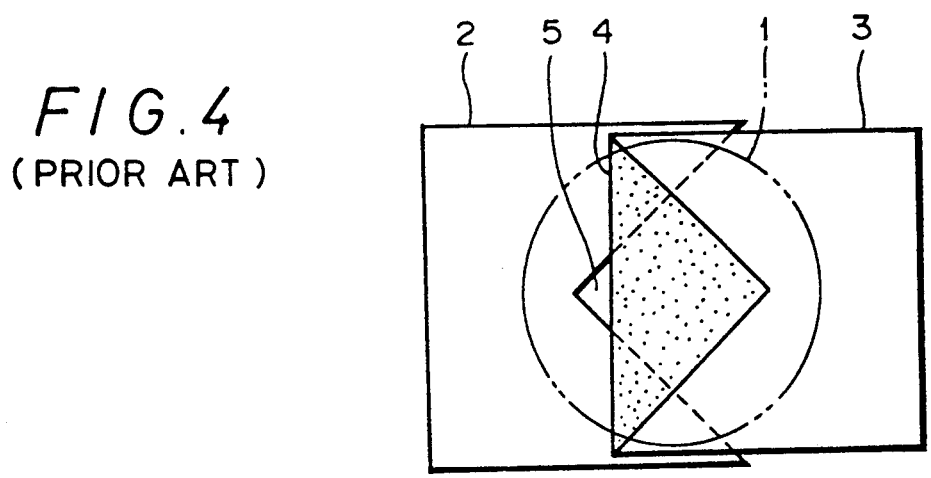

As described above, also in the present embodiment similarly to the embodiment shown in FIG. 6, even if vignetting occurs as earlier explained with reference to FIGS. 1 and 2, a light passing through the transparent portion 6' arrives also at a peripheral portion of the imager plane, because of the transparent portion 6' positioned on a substantially central portion of the optical path 1, whereby the lighting will not be remarkably different between a peripheral portion and a central portion of a picked up image. In a condition where the iris is tightly narrowed, the light on the optical path 1 passes only through the overlap portion 7'' of the two ND filters 32, 42, thereby making it possible to limit the light amount twice as much compared with a case of limiting the amount of a passing light only by a single ND filter, i.e., efficient limiting of the light amount can be achieved.

Incidentally, in the respective embodiments described above, the iris is composed of two diaphragms, however, the iris may be composed of more than two diaphragms. In this case, the ND filters may be attached on at least two diaphragms, whereby a transparent portion is formed on a substantially central portion of the optical path when the iris is half closed, and the transparent portion is completely surrounded by the ND filters, with the result that effects similar to those produced by the above-mentioned respective embodiments are obtained. It should be noted that an ND filter may be attached on each of the more than two diaphragms.

According to the present invention, since the transparent portion is completely surrounded by the light amount limiting filters when the iris is half closed, the plain glass portion is always positioned on a substantially central portion of the optical path. Therefore, even if the optical path is partially vignetted, the transparent portion is vignetted to a much lesser degree, thereby preventing a peripheral portion of a picked up image from becoming dark due to vignetting and accordingly enabling a satisfactory shooting where the lighting is hardly different between a central portion and a peripheral portion of a picked up image.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claim.

We claim as our invention:

1. A video camera for converting an optical image arriving at an imager through an optical system including lenses and an iris to a video signal,
    wherein said iris is composed of two opaque diaphragms of arcuate shape mounted for relative pivotal movement toward or away from each other and having facing cut-away portions thereon and light transmission limiting, neutral density filters having predetermined identical light limiting characteristics respectively attached on said two diaphragms at said cut-away portions so that said light transmission limiting, neutral density filters are likewise mounted for relative movement toward or away from each other; and
    said light transmission limiting, neutral density filters attached on said two diaphragms being arranged to completely surround a central open portion of said iris so that light passes through said central open portion and said light transmission limiting, neutral density filters at a first position when said iris is partially closed and said two light transmission limiting, neutral density filters overlap each other at varying degrees at a central portion of said iris so that light passes only through said light transmission limiting, neutral density filters when said iris is at a more fully closed position.

2. A video camera for converting an optical image arriving at an imager through an optical system including lenses and an iris to a video signal according to claim 1, wherein said two neutral density filters have a density of between 0.6 and 1.2 and said two diaphragms having said light transmission limiting filters respectively attached thereon are selectively pivotable about their respective ends so as to effect said relative movement of said two diaphragms having said light transmission limiting, neutral density filters attached thereon toward or away from each other for opening and closing said iris.

3. A video camera for converting an optical image arriving at an imager through an optical system including lenses and an iris to a video signal, according to claim 1, wherein said two diaphragms having said light transmission limiting, neutral density filters attached thereon are selectively slidable so as to effect said relative movement thereof toward or away from each other for opening and closing said iris.

* * * * *